March 31, 1953  C. H. SIMON  2,633,143
HYDRANT

Filed Jan. 12, 1950  2 SHEETS—SHEET 1

Inventor
CARL H. SIMON
By Munn, Liddy & Glaccum
Attorneys

Patented Mar. 31, 1953

2,633,143

UNITED STATES PATENT OFFICE 2,633,143

HYDRANT

Carl H. Simon, Williamsport, Pa., assignor to Darling Valve & Manufacturing Company, Williamsport, Pa., a corporation of Pennsylvania Application January 12, 1950, Serial No. 138,186

6 Claims. (Cl. 137—298)

This invention relates to fire hydrants and has for its principal object the provision of a hydrant wherein the working mechanism is isolated from the fluid passing through the valve.

Another object of this invention is the elimination of the stuffing box arrangement conventionally used in hydrant construction and the replacement thereof with a novel O-ring sealing application which will insure continuous free operation of the working parts of the hydrant.

A further object of my invention is to present a hydrant structure incorporating anti-friction thrust bearings installed in such a manner as to permit ease in opening and closing the hydrant valve under pressure.

Still other objects and advantages will become apparent from the following description of the present invention illustrated in the accompanying drawing, in which.

Similar reference characters represent similar parts in the several figures.

The design of fire hydrants of the non-rising stem type for many years has presented an arrangement of operating mechanism which at times becomes not only objectionable but actually dangerous. Conventional working parts have consisted of an operating nut either directly exposed or ineffectively sealed from the line fluid passing through the valve. The main effort has been in an attempt to provide an effective stuffing box for sealing the stem clearance to prevent leakage from the hydrant. This structure permits access of the line fluid to the working elements of the unit and as a result there is an inevitable tendency for the accumulation of foreign matter and the clogging and wearing of relatively movable parts.

Figure 1:
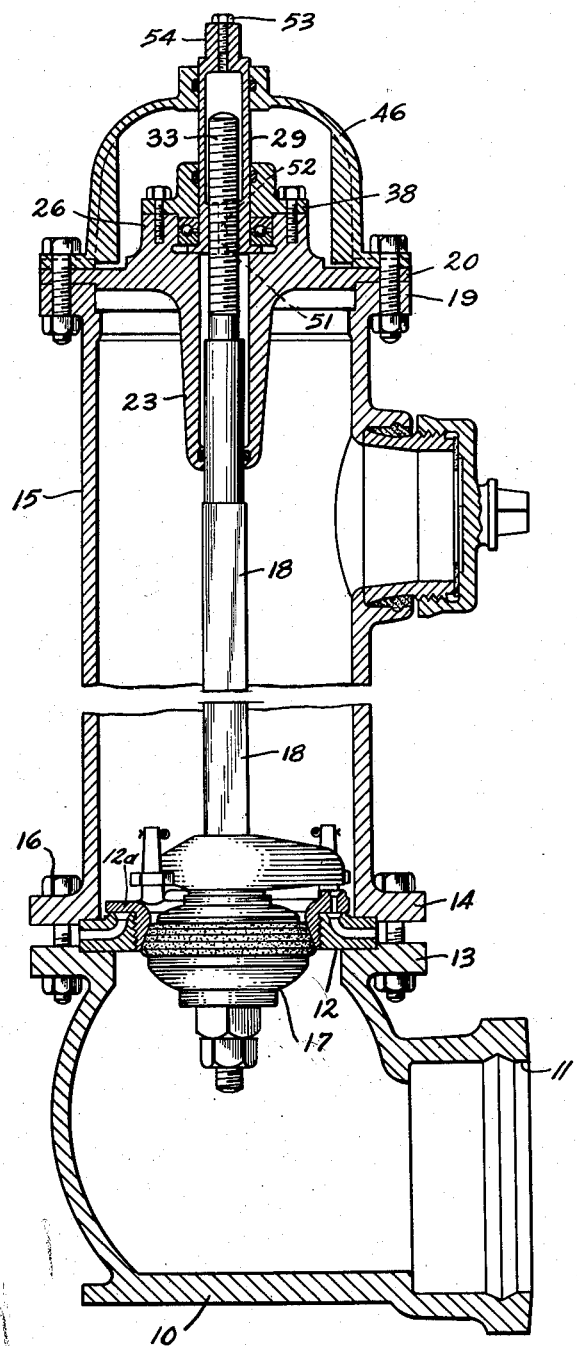
Figure 1 is a sectional view of a hydrant embodying the present invention.
Figure 2:
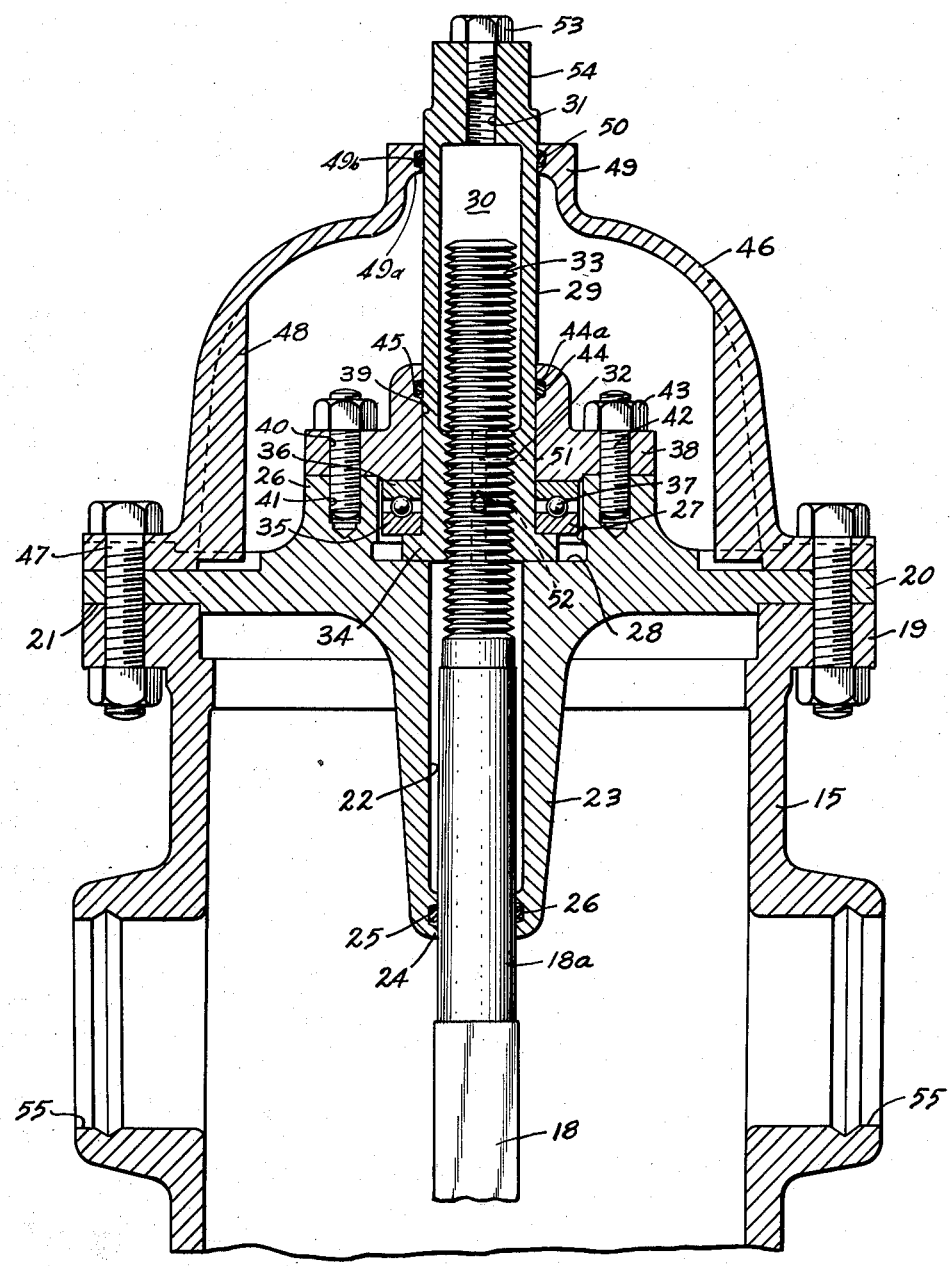
Figure 2 is an enlarged view of the working mechanism shown in Fig. 1.

In order to overcome the above objectionable features of hydrants now available, I have devised the operating mechanism shown in Figures 1 and 2 of the drawings. Figure 1 shows a compression fire hydrant with an elbow base 10 having a lateral inlet port 11 and an open upper end upon which rests a main valve seat ring 12 which retains the valve seat 12ª. Ring 12 is securely clamped between the rim flange 13 on the base and a mating flange 14 formed at the lower end of the hydrant barrel 15. Removable bolts 16 provide convenient connecting means for affecting the joining of the base and barrel sections. Cooperating with the seat 12ª is a valve ball 17 removably carried at the lower end of valve rod 18 which extends upwardly to engage the hydrant operating mechanism for reciprocating movement.

The novel operating mechanism shown in Figure 2 of the drawings is adapted to replace the conventional mechanism now present in hydrants already installed. This advantageous change-over is possible without alteration of the basic structure of the hydrant and with a minimum of time and labor. As will be seen in Figure 2 the uppermost end of hollow barrel 15 is conventionally formed with an outwardly extending annular flange 19. This flange supports a circular thrust plate 20 the lower surface of which is provided with a peripheral recess 21 permitting snug engagement of the thrust plate with barrel flange 19.

Thrust plate 20 contains a central aperture 22 defined primarily by a downwardly depending elongated boss 23. The lower end of boss 23 is formed with an internal annular rim 24 of sufficient magnitude to closely surround a reduced section 18ª formed on the upper end of valve rod 18. In order to insure an effective seal between the interior of hydrant barrel 15 and chamber 22, the rim 24 has formed on the inner face thereof a recess 25 adapted to receive an O-ring packing 26 of rubber, neoprene or the like. This type of packing provides an extremely effective means for obtaining a perfect seal and has an additional advantage in the present use since constant kneading by the reciprocating valve rod retains the pliable characteristics of the plastic packing material.

The upper face of thrust plate 20 contains a stub boss 26 having a centrally formed recess 27 coaxial with and as an extension of chamber 22. Recess 27 is of greater diameter than chamber 22 and has a horizontally disposed bottom surface 28, upon which rest elements of the valve operating mechanism.

The major element of the above mentioned mechanism consists of a hollow operating nut 29 provided with a central lubricant chamber 30. This chamber is connected to the exterior of the nut by means of a threaded passage 31 at its upper end and a second and longer threaded passage 32 at its lower end, passage 32 being adapted to receive the threaded end 33 of the valve rod for reciprocation of the same upon rotation of nut 29. The base of the operating nut is provided with an outwardly extending annular flange 34 which acts as a bearing for the operating nut against surface 28 of the trust plate.

In order to insure ease in opening and closing the hydrant under pressure I have incorporated an anti-friction bearing race consisting of lower and upper bearing rings 35 and 36 respectively having a plurality of ball bearings 37 confined therebetween. The lower ring 35 abuts the upper surface of flange 34 formed on the operating nut. The upper ring 36 is held in place by means of an annular bearing plate 38 which has a diameter equal to that of boss 26 and a centrally bored aperture 39 of such diameter to permit insertion of the shank of operating nut 29. Plate 38 contains a plurality of drilled apertures 40 which are alined with threaded holes 41 formed in the upper face of the thrust plate boss 26. Bolts 42 which are threaded into holes 41 are each adapted to receive a nut 43 on its upper end in order that plate 38 may be firmly secured against the anti-friction race. A second seal is provided on the inner surface of an upstanding boss 44 formed in the bearing plate 38 previously described. An annular recess 44a carries an O-ring seal 45 which effectively prevents foreign matter from seeking the working mechanism and further prevents escape of lubricant from the interior of the assemblage.

The protection of the hydrant operating mechanism is brought about by the inclusion of a bell-type bonnet or cover 46 which holds the thrust plate 20 in position and is secured to the top of the hydrant barrel by means of bolts 47 received in alined apertures in the cover, thrust plate and peripheral flange 19 of the barrel. Cover 46 is designed for ease in handling and is provided on its inner surface with spaced reinforcing ribs 48 which strengthen the structure and obviates the necessity of forming the cover of unduly heavy cast material. A boss 49 formed at the top of cover 46 receives the upper portion of the operating nut shank, the boss being provided with an internal annular rim 49a. A recess 49b formed on the inner face of rim 49a carries an additional O-ring seal 50 to prevent moisture and other matter from gaining access to the interior of the cover.

The lubrication system embodied in my present invention consists of the previously mentioned lubricant chamber 30 which may be periodically filled through channel 31 in the top of the operating nut. The chamber is adequately covered by a lubricating screw 53 retained in the threaded intake channel 31. The threads of the valve rod are effectively lubricated by the surrounding oil in chamber 30 and by means of one or more vertical grooves 51 (Fig. 1) formed within operating nut 29. Grooves 51 further function to convey lubricant to intersecting lateral passages 52 and thus furnish abundant lubrication to the anti-friction race and to recess 27 which surrounds the moving parts of the mechanism. At this point it is well to note that O-rings 26 and 45 cooperate to not only protect the hydrant operating mechanism from foreign matter but also to effectively retain the lubricant within its intended area.

In the operation of this hydrant the conventional hydrant operating wrench is applied to the polygonal or otherwise conventionally shaped end 54 of the operating nut which projects through the hydrant cover 46. Rotation of the nut causes the non-rotatable valve rod 18 to move vertically downward to unseat the valve ball 17 and permit line fluid to pass upwardly through the hydrant barrel and out one or more outlets 55 in the hydrant side wall. Operation of the working parts is easily performed since the operating nut, the valve rod threads and their cooperating elements are at all times isolated from the effects of line fluid and matter carried therein. Perfect lubrication and anti-friction bearing means assist in insuring ease in operation.

From the foregoing description of the present invention it will be seen that I have devised a novel hydrant construction which affords an operating efficiency heretofore unapproached in the hydrant art. This structure further presents economical and safety factors which represent a major step forward in the fire hydrant industry.

While I have shown and described a preferred form of my invention, it will be understood that variations in details of form may be made without departure from the invention as defined in the appended claims.

I claim:

1. A hydrant comprising a casing having fluid inlet and outlet openings therein, a valve controlling fluid flow through said casing, a vertical rod attached to said valve and having a threaded upper end, a thrust plate secured to the top of said casing and having a centrally disposed boss depending from the bottom face thereof, said plate and boss being apertured to receive the valve rod, a recess in the upper face of said plate, an internally threaded hollow operating nut adapted to receive the valve rod for reciprocating the rod and having an annular flange contacting the plate at the bottom of said recess, an anti-friction bearing contacting said flange, means for holding said bearing in position, comprising a plate having an aperture formed therein for receiving said operating nut, said last-named plate having a recess therein, a seal in said recess acting between said last-named plate and said operating nut, said depending boss being of sufficient length to completely cover the threads on said rod during operation of the valve, a sealing ring between the end of said boss and valve rod for isolating said nut and threaded end from fluid within the hydrant, means for introducing lubricant into said operating nut, and a passage connecting the interior of said nut and said plate recess.

2. A hydrant comprising a casing having fluid inlet and outlet openings therein, a valve controlling fluid flow through the casing, a vertical rod attached to said valve and having a threaded upper end, a thrust plate secured to the top of said casing and having a centrally disposed boss depending from the bottom face thereof, said plate and boss being apertured to receive the valve rod, a recess in the upper face of said plate, an internally threaded hollow operating nut adapted to receive the valve rod for reciprocating the rod and having an annular flange contacting the plate at the bottom of said recess, an anti-friction bearing contacting said flange, means for holding said bearing in position, said depending boss being of sufficient length to completely cover the threads on said rod during operation of the valve, the lower end of said boss having a groove formed on the inner surface thereof, an O-ring seal in said groove for isolating said nut and threaded end from fluid within the hydrant, means for introducing lubricant into said operating nut, a passage connecting the interior of said nut and said plate recess for introducing lubricant to said bearing, said depending boss forming a lubricant chamber surrounding said valve rod, and a passage connecting the interior of said nut and said chambers.

3. In a hydrant comprising a casing having fluid inlet and outlet openings therein, a valve controlling fluid flow through said casing, a vertical rod attached to said valve and having a threaded upper end, a thrust plate secured to the top of said casing and having a centrally disposed boss depending from the bottom face thereof, said plate and boss being apertured to receive the valve rod, an internally threaded operating nut adapted to receive the valve rod and having an annular flange contacting said plate, the combination therewith of an anti-friction bearing contacting a longitudinally disposed surface of said flange, means for holding said anti-friction bearing in position comprising a bearing plate contacting a longitudinally disposed surface of said bearing, said bearing plate having an aperture therein receiving said operating nut, said bearing plate having a recess therein, an O-ring seal in said recess contacting said bearing plate and said operating nut, said O-ring seal serving to retain lubricant between said bearing plate and said operating nut and prevent the intrusion of foreign matter between the bearing plate and operating nut but permitting substantially frictionless relative movement between said bearing plate and operating nut.

4. In a hydrant comprising a casing having fluid inlet and outlet openings therein, a valve controlling fluid flow through said casing, a vertical rod attached to said valve and having a threaded upper end, a thrust plate secured to the top of said casing having an aperture therein to receive said vertical rod, and an internally threaded operating nut adapted to receive said rod and having an annular flange contacting said plate, the combination of an anti-friction bearing contacting said annular flange, a bearing plate retaining said anti-friction bearing in position, said bearing plate enclosing a portion of said nut, and having a recess therein, an O-ring seal in said recess acting between said bearing plate and said nut, said thrust plate having a recess therein below said operating nut, an O-ring seal in said recess acting between said thrust plate and said rod, said thrust plate having a lubricant chamber therein above said last named seal surrounding said rod, said operating nut having a recess therein above the threads therein forming a lubricant chamber around a portion of said rod, an opening in said nut for introducing lubricant into said last-named chamber, said nut having channels formed therein providing passage for lubricant from said chamber therein to said anti-friction bearing and said lubricant chamber in said plate, said chambers and said channels constituting a continuous lubricating chamber for the working elements set forth above and said seals constituting a means for fully enclosing said working elements so as to retain lubricant and prevent the entrance of foreign matter into contact therewith.

5. The combination of claim 4 in which said opening in said operating nut for introducing lubricant therein extends outside said hydrant casing.

6. The combination of claim 5 in which said casing has a recess therein, an O-ring seal in said recess contacting said casing and said operating nut.

CARL H. SIMON.

REFERENCES CITED

The following references are of record in the file of this patent:

UNITED STATES PATENTS

| Number | Name | Date |
| --- | --- | --- |
| 631,545 | Loetzer | Aug. 22, 1899 |
| 1,091,210 | Gauntt | Mar. 24, 1914 |
| 1,340,352 | Whitmore | May 18, 1920 |
| 1,349,062 | Goldberg | Aug. 10, 1920 |
| 1,669,668 | Marshall | May 15, 1928 |
| 2,018,454 | Lofton | Oct. 22, 1935 |
| 2,078,782 | Storey | Apr. 27, 1937 |
| 2,200,770 | McBurdick | May 14, 1940 |
| 2,296,145 | Christensen | Sept. 15, 1942 |
| 2,424,331 | Rose | July 22, 1947 |
| 2,583,291 | Beem | Jan. 22, 1951 |